United States Patent
Ono

(10) Patent No.: US 8,056,934 B2
(45) Date of Patent: Nov. 15, 2011

(54) MARINE HOSE

(75) Inventor: Syunichi Ono, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/442,368

(22) PCT Filed: Feb. 29, 2008

(86) PCT No.: PCT/JP2008/053644
§ 371 (c)(1),
(2), (4) Date: Mar. 20, 2009

(87) PCT Pub. No.: WO2008/108296
PCT Pub. Date: Sep. 12, 2008

(65) Prior Publication Data
US 2009/0314374 A1  Dec. 24, 2009

(30) Foreign Application Priority Data
Mar. 2, 2007  (JP) .................................. 2007-053372

(51) Int. Cl.
*F16L 33/01* (2006.01)
(52) U.S. Cl. ...... 285/222.4; 285/1; 285/222.1; 285/922; 138/106; 138/109; 405/166
(58) Field of Classification Search .................. 285/1, 222.1–222.4, 254, 922; 138/106, 109, 112; 405/166, 170
See application file for complete search history.

(56) References Cited

U.S. PATENT DOCUMENTS

| | | | | |
|---|---|---|---|---|
| 3,428,092 A | * | 2/1969 | Skinner et al. | 138/110 |
| 3,613,736 A | * | 10/1971 | Kuwabara | 285/239 |
| 4,114,657 A | * | 9/1978 | Langenfeld | 138/109 |
| 4,153,079 A | | 5/1979 | Ambrose | |
| 4,225,158 A | * | 9/1980 | Puechavy | 285/47 |
| 4,234,019 A | * | 11/1980 | Hornor et al. | 138/109 |
| 4,549,919 A | * | 10/1985 | Auberon et al. | 156/172 |
| 4,676,696 A | * | 6/1987 | Laursen | 405/169 |
| 4,714,380 A | * | 12/1987 | Coutarel | 405/168.3 |
| 4,955,970 A | * | 9/1990 | Kivi et al. | 285/222.3 |
| 4,988,128 A | * | 1/1991 | Do et al. | 285/222.1 |
| 7,631,667 B2 | * | 12/2009 | Brink et al. | 138/109 |
| 2009/0145506 A1 | * | 6/2009 | Queau et al. | 138/112 |

FOREIGN PATENT DOCUMENTS

| | | |
|---|---|---|
| GB | 2272740 A * | 5/1994 |
| JP | B2 42-3353 | 2/1967 |
| JP | 50-144124 | 11/1975 |
| JP | Y2 2-38155 | 10/1990 |
| JP | A 7-293800 | 11/1995 |
| JP | 10-507709 | 7/1998 |

* cited by examiner

*Primary Examiner* — James Hewitt
(74) *Attorney, Agent, or Firm* — Greer, Burns & Crain, Ltd.

(57) ABSTRACT

In the marine hose of the present invention, protruded parts are provided at each axial direction end of the axial direction ends of the hose bodies, each axial direction end is located at both sides in the axial direction of the connection portion which is provided with limit mechanism. By this, when the marine hose is wound up to the reel, the protruded parts of the hose bodies contact the outer surface of the reel, the outer surface of the limit mechanism does not contact the outer surface of the reel. Thus, large amount of the bending force is not added to the limit mechanism.

1 Claim, 4 Drawing Sheets

MARINE HOSE

This application is a U.S. National Phase under 35 U.S.C. §371 of International Application No. PCT/JP2008/053644, filed Feb. 29, 2008.

TECHNICAL FIELD

The present invention relates to a marine hose for transporting liquid which transports liquid, such as crude oil, from tanker to tank located on the land, for example.

BACKGROUND ART

As shown in FIG. 5 to 7, a generally known marine hose has a plurality of hose bodies 100 of which the ends in the axial direction are connected each other, a plurality of connection portions 110 for connecting said ends of the hose bodies 100 to each other, a limit mechanism 120 provided to at least one of the connection portions 110, the limit mechanism 120 releases the mutual connection of the hose bodies 100 by separating at its approximate middle portion and the limit mechanism 120 closes the ends of the hose bodies 100, when the tensile force having a predetermined amount or larger in the axial direction is added to the connection portion 110 which is provided with the limit mechanism 120. The marine hose transports liquid fuel from a tanker to a tank located on the land.

Also, a storage apparatus for storing this kind of marine hose has a reel which is capable of winding up the marine hose. This storage apparatus winds up the marine hose floating on the sea by rotating the reel.

Patent Document 1: Japanese Patent publication H07-293800

Patent Document 2: Japanese Patent publication H10-507709

DISCLOSURE OF THE INVENTION

Problem to be Solved by the Invention

In the above-described marine hose, when the large amount of the tensile force is added to the marine hose by the movement of the tanker, the limit mechanism 120 works before the hose bodies 100 and connection portions 110 get broken. By this, leak of liquid from hose bodies 100 and connection portions 110 is prevented. Thus, the connecting strength of connection portion 110 which is provided with the limit mechanism 120 is weaker than the connecting strength of other connection portions 110.

On the other hand, said storage apparatus is constituted so as to wind up the marine hose floating on the sea by rotating the reel, and the marine hose is a heavy object. By this, the large amount of tensile force is generated to the marine hose which is still not wound up to the reel due to the weight of the marine hose and the water resistance. Thus, when the marine hose is wound up to the reel, the marine hose is pushed toward the outer surface RE of the reel by the large amount of force, and the marine hose curves along the outer surface RE of the reel.

In this case, the end portions of the hose bodies 100 are formed to taper-like shape in which the outer diameter becomes gradually smaller toward the connection portion 110 side. By this, when the marine hose is wound up to the reel, the outer surface of approximate middle portion in the axial direction of the limit mechanism 120 contacts the outer surface RE of the reel. Thus, as shown in FIG. 7, the approximate middle portion in the axial direction of the limit mechanism 120 is supported by the outer surface RE of the reel, the large amount of downward force is added to both of the end portions in the axial direction of the limit mechanism 120, and the large amount of bending force is added to the limit mechanism 120. By this, the limit mechanism 120 works unnecessarily at the time of being wound up to the reel. Also, because it consumes costs and time at the time the limit mechanism 120 works, it is impossible to provide the limit mechanism 120 to the marine hose which is wound up to the reel.

An object of the present invention is to provide a marine hose of which a limit mechanism does not work unnecessarily at the time of being wound up to a reel.

Means for Solving the Problem

To achieve the above object, a marine hose in accordance with the present invention includes a plurality of hose bodies of which the ends in the axial direction are connected each other, a plurality of connection portions for connecting the ends of the hose bodies each other, a limit mechanism provided to at least one of the connection portions, the limit mechanism releases the connection and closes the ends of the hose bodies when a tensile force having a predetermined amount or larger in the axial direction is added to the connection portion which is provided with the limit mechanism, a protruded part provided to at least each axial direction end of the hose bodies located at both sides in the axial direction relative to the connection portion which is provided with the limit mechanism, the protruded part formed so as to protrude toward the radial direction compared to an outer surface of the connection portion which is provided with the limit mechanism.

By this, the protruded part is provided to each axial ends located at both sides in the axial direction relative to the connection portion which is provided with the limit mechanism, the protruded part protrudes toward the radial direction compared to the outer surface of the connection portion which is provide with the limit mechanism. Thus, when a portion of the marine hose adjacent to the connection portion with the limit mechanism is wound up to the reel, the protruded part of each hose body contacts an outer surface of a reel, an outer surface of the limit mechanism does not contact the outer surface of the reel.

Effect of the Invention

According to the marine hose of the present invention, when the portion of the marine hose adjacent to the connection portion with the limit mechanism is wound up to the reel, the protruded part of each hose body contacts the outer surface of the reel, the outer surface of the limit mechanism does not contact the outer surface of the reel. Therefore, when the marine hose is wound up to the reel, the large amount of tensile force added to the marine hose is supported by the protruded parts located at both sides in the axial direction relative to the limit mechanism. Thus, the large amount of bending force is not added to the limit mechanism. By this, the limit mechanism does not work unnecessarily at the time of being wound up to the reel, and it becomes possible to provide the limit mechanism to the marine hose which is wound up to the reel.

The above and other objects, features, and advantages of the present invention will become more apparent from the following description and the accompanying drawings.

DESCRIPTION OF SYMBOLS

10 ... hose body, 11 ... inner tube, 12 ... pressure-resistant code layer, 13 ... buoyancy member layer, 14 ... cover rubber, 14a ... protruded part, 20 ... connection portion, 21 ... joint member, 22 ... flange portion, 22a ... mounting hole, 30 ... limit mechanism, 31 ... flange portion, 100 ... hose body, 110 ... connection portion, 120 ... limit mechanism, RE ... the outer surface of the reel, BL ... break line.

BEST MODE FOR CARRYING OUT THE INVENTION

Figure 1:
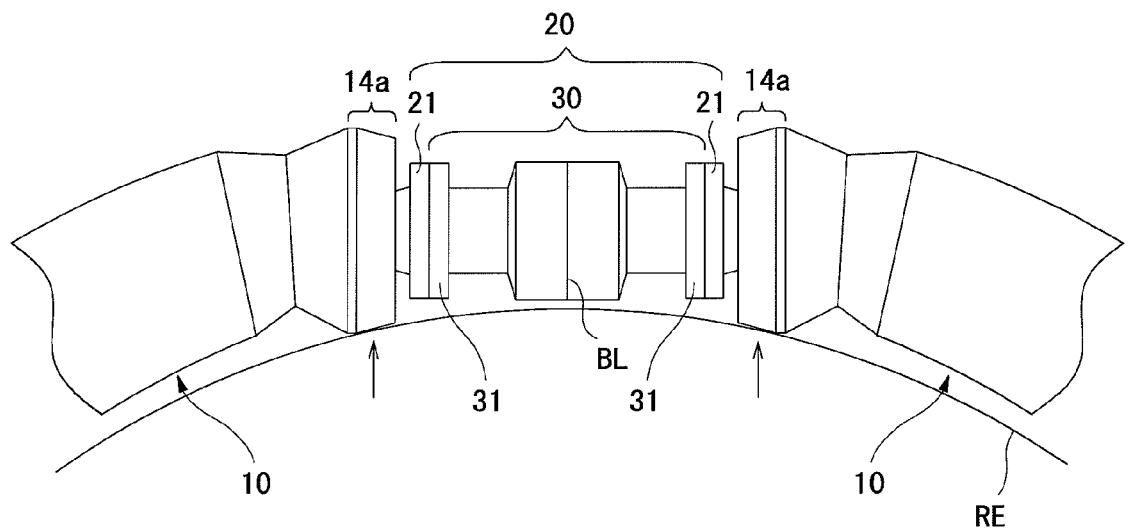
FIG. 1 is an operation view of a marine hose at the time of being wound up to a reel, and is showing an embodiment of the present invention.
Figure 2:
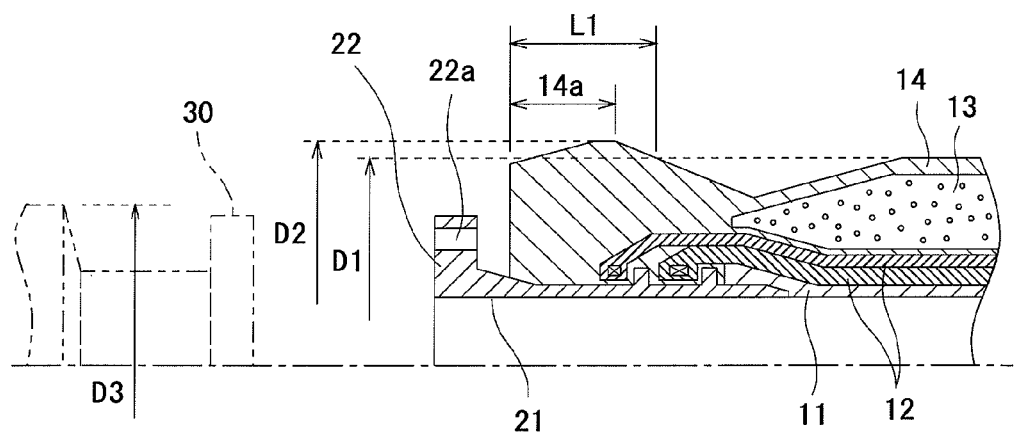
FIG. 2 is a part of sectional view of the marine hose.
Figure 3:
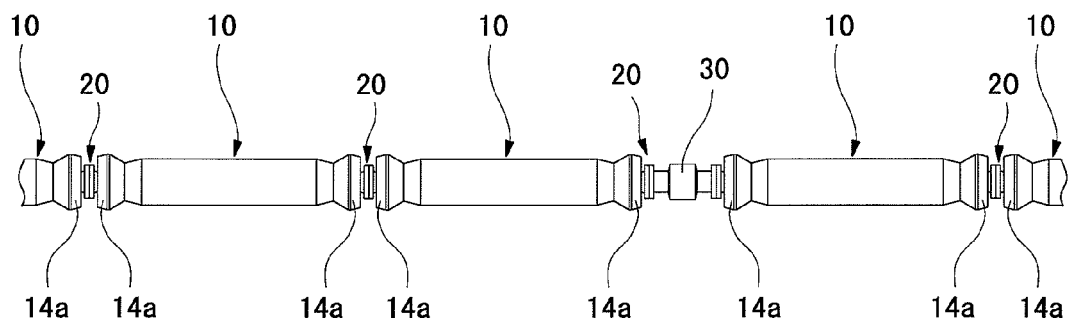
FIG. 3 is a side view of the marine hose.

FIGS. 1 to 3 show a embodiment of the present invention. FIG. 1 is an operation view of a marine hose at the time of being wound up to a reel, FIG. 2 is a part of sectional view of the marine hose, FIG. 3 is a side view of the marine hose.

This marine hose includes a plurality of hose bodies 10 of which the ends in the axial direction are connected each other, a plurality of connection portions 20 for connecting the ends of the hose bodies 10 to each other, a limit mechanism 30 provided to at least one of the connection portions 20. The limit mechanism 30 releases said connection and closes the ends of the hose bodies 10 when a tensile force having predetermined amount or larger in the axial direction is added to said connection portion. This marine hose, for example, connects a tanker anchoring in the sea with a tank on the land, and transports liquid, such as crude oil, from the tanker to the tank on the land. Also, when the transportation is finished, the marine hose is wound up by a reel of a predetermined storage apparatus to be stored.

The hose body 10 includes a inner tube 11 located at the innermost side in the radial direction, a pressure-resistant code layer 12 provided along the outer surface of the inner tube 11, a buoyancy member layer 13 located along the outer surface of the pressure-resistant code layer 12, a cover rubber 14 formed so as to cover the inner tube 11, the pressure-resistant code layer 12 and buoyancy member layer 13. The inner tube 11 is made from oil-resistant rubber such as NBR (acrylonitrile-butadiene rubber). The pressure-resistant code layer 12 is an oil-resistant rubber sheet having reinforcement codes made from polyester, nylon, metal, etc. The buoyancy member layer 13 is made of sponge-like member and provided for floating the marine hose in the sea. The cover rubber 14 is made from weather-resistant rubber such as SBR (styrene-butadiene rubber) or CR (chloroprene rubber). The marine hose generally includes the inner tube 11, pressure-resistant code layer 12, buoyancy member layer 13 and cover rubber 14. According to demands, it is possible to eliminate the buoyancy member layer 13, and also to add other structures.

A protruded part 14a is provided in an axial predetermined area L1 from the end in the axial direction of the hose body 10, the protruded part 14a has a outer diameter D2 which is larger than a maximum outer diameter D3 of limit mechanism 30 and joint member 21. More precisely, a difference in the outer diameter dimension between said maximum outer diameter D3 and outer diameter D2, and the axial predetermined area L1 are set up so that the outer surface of the limit mechanism 30 does not contact the outer surface RE of the reel and the protruded parts 14a of the hose bodies 10 contact the outer surface RE of the reel when a portion of the marine hose adjacent to the connection portion 20 with the limit mechanism 30 is wound up to the reel. Also, the protruded part 14a is formed so that the outer diameter D2 becomes larger than a outer diameter D1 of the part except the protruded part 14a of the hose body 10, the outer surface of the protruded part 14a is formed to taper-like shape in which the outer diameter becomes gradually smaller toward the axial outside of the hose body 10. Thus, the protruded parts 14a is provided at the ends in the axial direction of the hose bodies 10, the protruded part 14a protrudes toward the radial direction compared to the outer surface of the connection portion 20, and the protruded part 14a protrudes toward the radial direction compared to the part except the protruded part 14a of the hose body 10. Also, the protruded part 14a is a part of the cover rubber 14, the hose body 14 is formed so that the buoyancy member layer 13 is not located at a axial direction area which is provided the protruded part 14a.

The connection portion 20 is made of each of the joint members 21 attached respectively to the ends of the hose bodies 10. The joint member 21 is made from metal material and formed to cylindrical shape. The hose body 10 is fixed to the outer surface of one axial direction end side of the joint member 21, a flange portion 22 is formed at the other end side in the axial direction of the joint member 21 and the flange portion 22 is formed so as to extend radial outward. A plurality of mounting holes 22a are provided at the outer surface side of the flange portion 22 and the mounting holes 22a are arranged at intervals in the circumferential direction.

The limit mechanism 30 is a cylindrical shape. The both end in the axial direction of the limit mechanism 30 respectively has flange portions 31. Each flange portion 31 is respectively provided with a plurality of mounting holes (not shown in drawings), and each mounting hole is disposed at each position corresponding to each mounting hole 22a of the joint member 21. The limit mechanism 30 is provided with a flow passage (not shown in drawings) in which a liquid such as crude oil flows in the axial direction. Also, when a axial direction tensile force having a predetermined amount or larger in the axial direction is added to the limit mechanism 30, the limit mechanism 30 separates in the axial direction at the break line BL which is provided at approximate middle portion in the axial direction thereof, and then said flow passage in which the liquid such as crude oil flows is closed. Thus, if the axial direction tensile force having a predetermined amount or larger in the axial direction is added to the connection portion 20 which is provided with the limit mechanism 30, the connection portion 20 releases the connection between the ends of the hose bodies 10 by the limit mechanism 30, and closes each axial direction end of the hose bodies 10.

By disposing the hose bodies 10 so as to be arranged in the axial direction and connecting the flange portions 22 of the joint members 21 of hose bodies 10 adjacent to each other by a plurality of bolts (not shown in drawings), the ends in the axial direction of the hose bodies 10 are connected to each other. Also, at least one of the connection portions 20 is connecting the axial direction ends of the hose bodies 10 via the limit mechanism 30. Thus, one of the flange portions 31 of the limit mechanism 30 is connected to the flange portion 22 of the joint member 21 of one of the hose bodies 10 by a plurality of bolts, the other flange portion 31 of the limit mechanism 30 is connected to the flange portion 22 of the joint member 21 of the other hose body 10 by a plurality of bolts.

In the marine hose of above described embodiment, at least one of the connection portion 20 is provided with the limit mechanism 30. By this, when the axial direction tensile force having the predetermined amount or larger in the axial direction is added to the connection portion 20, the connection portion 20 releases the connection between the axial direction ends of the hose bodies 10 by the limit mechanism 30, and closes each ends of the hose bodies 10. If the large amount of tensile force is added to the marine hose by the movement of the tanker, the limit mechanism 30 works before the hose bodies 10 or the connection portions 20 break. Therefore, it is possible to prevent leak of the liquid from the hose bodies 10 or the connection portions 20.

Also, the protruded parts 14a are provided to at least each axial direction end of the hose bodies 10 located at both sides in the axial direction relative to the connection portion 20 which is provided with the limit mechanism 30. Also, the protruded part 14a protrudes toward the radial direction compared to the outer surface of the connection portion 20 which is provided with the limit mechanism 30. By this, when the part adjacent to the connection portion 20 which is provided with limit mechanism 30 is wound up to the reel, the protruded parts 14a contact the outer surface RE of the reel and the outer surface of the limit mechanism 30 does not contact the outer surface RE of the reel (refer to FIG. 1).

Therefore, in this embodiment, when the part adjacent to the connection portion 20 which is provided with limit mechanism 30 is wound up to the reel, the protruded parts 14a contact the outer surface RE of the reel and the outer surface of the limit mechanism 30 does not contact the outer surface RE of the reel. By this, when the marine hose is wound up to the reel, the large amount of tensile force in the axial direction added to the marine hose is supported by the protruded parts 14a located at both sides, in the axial direction, relative to the limit mechanism 30. Thus, the large amount of bending force is not added to the limit mechanism 30. Therefore, the limit mechanism does not work unnecessarily at the time of being wound up to the reel, and it becomes possible to provide the limit mechanism 30 to the marine hose which is wound up to the reel.

Also, the protruded part 14a protrudes toward the radial direction compared to the hose body 10 except the protruded part 14a. By this, when the part adjacent to the connection portion 20 which is provided with the limit mechanism 30 is wound up to the reel, the protruded parts 14a certainly contact the outer surface RE of the reel. Therefore, when the marine hose is wound up to the reel, the large amount of tensile force added to the marine hose is certainly supported by the protruded parts 14a located at both sides, in the axial direction, relative to the limit mechanism 30. Thus, it is extremely advantageous to prevent unnecessary operation of the limit mechanism 30.

Also, the outer surface of the protruded part 14a is formed to taper-like shape in which the outer diameter becomes gradually smaller toward the axial outside of the hose body 10. By this, when the protruded part 14a contacts the outer surface RE of the reel, contact area between the protruded portion 14a and the outer surface RE of the reel becomes larger. Therefore, when the marine hose is wound up to the reel, it is possible to reliably support the large amount of tensile force added to the marine hose by the protruded portions 14a. It is desirable that the outer surface of the protruded part 14a is formed with a degree which makes the outer surface of the protruded part 14a extend along the outer surface RE of the reel which winds up the marine hose.

Also, because the protruded part 14a is a part of the cover rubber 14, the outer surface of the protruded part 14a is made from rubber material. By this, when the marine hose is wound up to the reel, if the marine hose is stacked on top of itself, the protruded parts 14a contact the part except the protruded parts 14a of the marine hose, the connection portions 20 do not contact the part except the protruded part 14a of the marine hose. Therefore, the part except the protruded part 14a of the marine hose is not hurt by the protruded part 14a or the connection portion 20. Thus, it is advantageous for planning to improve durability of the marine hose.

The hose body 10 is formed so that the buoyancy member layer 13 is not located at the axial direction area which is provided the protruded part 14a. By this, when the marine hose is wound up to the reel, it is possible to support the large amount of tensile force added to the marine hose by the protruded parts 14a located at both axial direction sides relative to the limit mechanism 30.

In this embodiment, the protruded parts 14a are provided at both ends, in the axial direction, of each hose body 10. On the other hand, it is possible to provide the protruded parts 14a to only each end located at both sides of the connection portion 20 which is provided with the limit mechanism 30.

Also, in this embodiment, the protruded parts 14a are provided to the hose body 10 which is provided with buoyancy member layer 13. On the other hand, it is possible to provide the protruded parts 14a to the hose body 10 which is not provided with buoyancy member layer 13.

Figure 4:
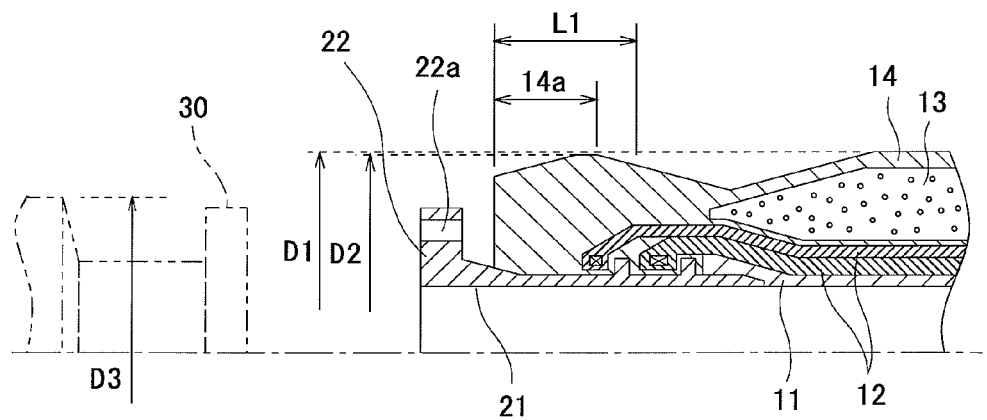
FIG. 4 is a part of sectional view of a marine hose showing a variation of the embodiment.
Figure 5:
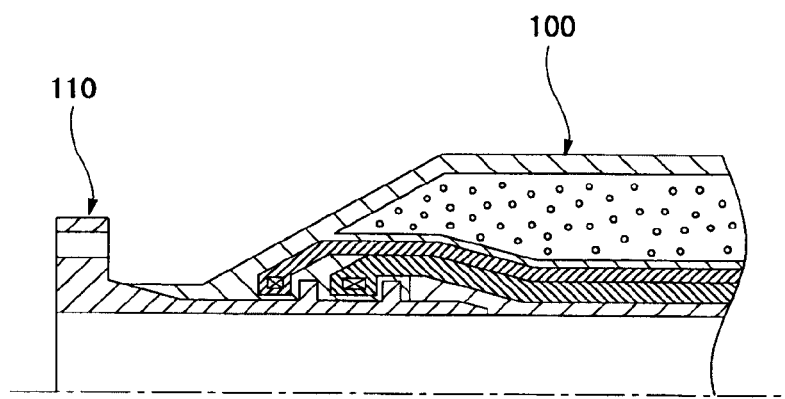
FIG. 5 is a part of sectional view of a marine hose showing a usual example.
Figure 6:
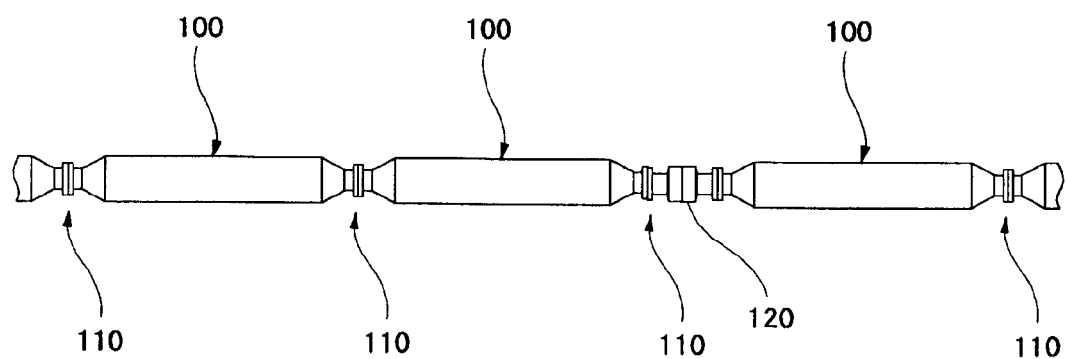
FIG. 6 is a side view of the marine hose showing the usual example.
Figure 7:
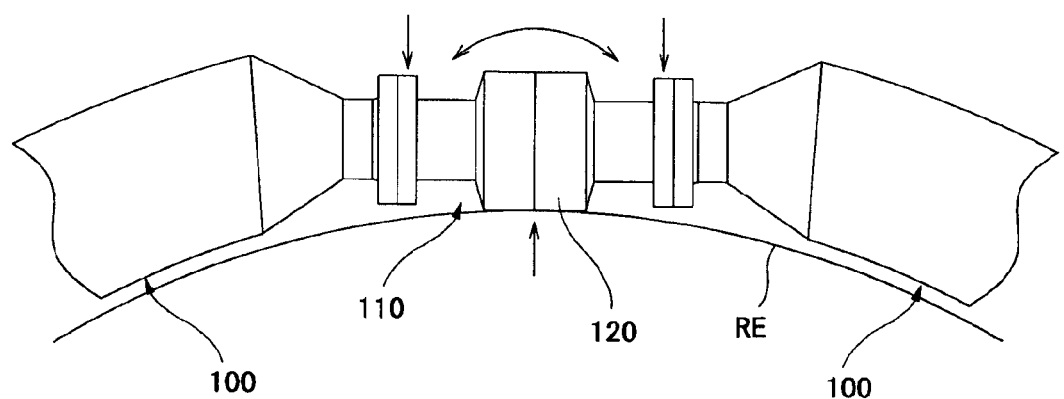
FIG. 7 is an operation view of the marine hose at the time of being wound up to a reel, and is showing the usual example.

Also, in this embodiment, the protruded part 14a protrudes toward the radial direction compared to the part except the protruded part 14a of the hose body 10. On the other hand, as shown in FIG. 4, when the protruded part 14a has the outer diameter D2 which is equal or less compared to the outer diameter D1 of the part except the protruded part 14a of the hose body 10, it is also possible to achieve above-mentioned effects. In this case, the outer diameter D2 of the protruded part 14a is formed larger than the maximum outer diameter D3 of the limit mechanism 30 and the joint member 21. Also, a difference in the outer diameter dimension between said maximum outer diameter D3 and the outer diameter D2, and the axial predetermined area L1 are set up so that the outer surface of the limit mechanism 30 does not contact the outer surface RE of the reel, and the protruded parts 14a of the hose bodies 10 contact the outer surface RE of the reel, when a portion of the marine hose adjacent to the connection portion 20 with the limit mechanism 30 is wound up to the reel. By this, when the marine hose is wound up to the reel, the large amount of tensile force added to the marine hose is supported by the protruded parts 14a located at both sides, in the axial direction, relative to the limit mechanism 30.

The preferred embodiments described in this specification are illustrative and not restrictive. The scope of invention is given by the appended claims, and all changes and modifications included in the meaning of claims are embraced in the present invention.

The invention claimed is:

1. A marine hose for transporting liquid and configured to be wound on a reel, comprising:
   a plurality of elongated hose bodies, each of said hose bodies having opposite ends each with a tapered part that extends from an outer diameter of a main hose portion of the hose body radially inward to an end part of the hose body, the end part of the hose body including a protruded part that defines an outermost diameter of the marine hose greater than the outer diameter of the main hose portion, the protruded part tapering from the outermost diameter radially inward;

a plurality of connection joint members provided at the opposite ends of the hose bodies for connecting the hose bodies to each other;

a limit mechanism provided between the joint members, the limit mechanism being configured and adapted to release a connection between the joint members and close the ends of the hose bodies when a tensile force having a predetermined amount or larger in the axial direction is added to the limit mechanism; and each protruded part being provided between the respective tapered part and the respective joint member, the protruded part, by virtue of its taper and its diameter being greater than that of the outer surface of the limit mechanism preventing the limit mechanism from coming in contact with the reel when the hose is wound on the reel.

* * * * *